United States Patent
Bailey et al.

(10) Patent No.: US 6,368,545 B1
(45) Date of Patent: Apr. 9, 2002

(54) HIGH CLARITY POLYOLEFIN MULTILAYER BLOWN COEXTRUDED FILM

(75) Inventors: Peter N. Bailey, Sevenoaks (GB); Stefan Bertil Ohlsson, Wespelaar; Willy Jozef Joanna Leysen, Meerhout, both of (BE)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 09/311,474

(22) Filed: May 13, 1999

(51) Int. Cl.[7] ............................................... B29C 47/06
(52) U.S. Cl. .................. 264/514; 264/565; 264/171.28; 264/173.14; 264/209.7
(58) Field of Search ................................. 264/514, 515, 264/563, 564, 565, 171.28, 173.14, 209.7; 428/213, 218, 517

(56) References Cited

U.S. PATENT DOCUMENTS

| 5,019,315 A | * | 5/1991 | Wilson |
| 5,376,439 A | * | 12/1994 | Hodgson et al. |
| 5,407,732 A | * | 4/1995 | Dokurno |
| 5,516,474 A | * | 5/1996 | Cloeren |
| 5,595,050 A | * | 1/1997 | Koch et al. |
| 5,614,297 A | * | 3/1997 | Velazquez |
| 5,814,399 A | * | 9/1998 | Eichbauer |
| 5,891,555 A | * | 4/1999 | O'Brien |
| 6,045,882 A | * | 4/2000 | Sandford |
| 6,094,889 A | * | 8/2000 | Van Loon et al. |
| 6,159,584 A | * | 12/2000 | Eaton et al. |

* cited by examiner

*Primary Examiner*—Mark Eashoo
(74) *Attorney, Agent, or Firm*—William G. Muller; Stephen D. Prodnak

(57) ABSTRACT

At least two techniques can be used separately or together to achieve higher clarity in multilayer blown coextruded films. In a first technique, the core layer is extruded at a higher temperature than the skin layer or layers. In the second technique, the core layer has a higher density than the skin layer or layers. Combinations of these techniques are also contemplated. Either one or both techniques may be used to a sufficient degree to improve clarity (generally lower haze).

17 Claims, No Drawings

HIGH CLARITY POLYOLEFIN MULTILAYER BLOWN COEXTRUDED FILM

FIELD OF THE INVENTION

The present invention relates to films of high clarity made on blown film coextrusion equipment and especially but not exclusively to metallocene and Ziegler-Natta catalyst produced ethylene copolymers and titanium chloride derived ethylene copolymers from which the films may be made. The films may be made using modified processing conditions and/or using selected density differentials between core and outer layer or layers of the film.

BACKGROUND

The manufacture of coextruded blown film and the equipment for making it are well known. As the film is drawn from the annular die in molten form, the film solidifies and crystallizes upon cooling. Multi-layer films have been made in which at least one surface or outer layer are made to facilitate heat-sealing. A core film layer may be used to provide strength, impact resistance, stretchability, the main physical properties of the film, or combinations thereof. Layers intermediate the surface layer and core layer, also referred to as inner layers in this context, may facilitate the mutual adhesion of the layers and/or may impart barrier properties against the transmission of moisture, carbon dioxide, oxygen, other gases and the like.

The polymers that are used in such processes for packaging applications include in general polyethylene, polypropylene, ethylene vinyl alcohol, various tie layers and the like.

Usually higher clarity is achieved in blown film applications by the inclusion of softer polyolefins, such as very low density polyethylene, ethylene vinyl acetate copolymers and the like. Such materials, while offering benefits in clarity, often result in undesirably soft films or film structures.

There is a commercial need therefore for a film and/or a film processing technique that will deliver higher clarity to a blown, multilayer film without compromising the desired stiffness.

SUMMARY

We have discovered that at least two techniques will accomplish the goal of higher clarity in blown films: (1) raising the temperature of one or more core layers in a multilayer film; (2) creating a density differential between the core and surface layer or layers, the core layer being of a higher density, or combinations of (1) and (2). This will result in blown films having substantially better clarity, manifested in part in lower haze values. These films will generally have at least three layers.

The polymers making up the blown multilayer films may be made with metallocene catalyst especially using methyl alumoxane or non-coordinating anions as activators or using conventional Ziegler-Natta catalysts such as titanium tetrachloride and an aluminum alkyl as activator or combinations of metallocene and Ziegler-Natta catalyst produced materials. The melt index can be one suitable for melt extrusion of films of from 0.1 to 3, preferably from 0.5 to 2 as measured by ASTM 1238, condition E.

The polymers may be made using known processes such as solution, slurry, gas phase and high-pressure polymerization techniques. According to process type, the catalyst components may be used on their own or on a support. Scavengers such as aluminum alkyls may be used to reduce the effects of catalyst poisons and catalyst activity in these processes.

Metallocene derived polyethylene has a lower blocking effect than Ziegler-Natta produced materials when used as one or both surface layers and will therefore generally be preferred in this application. In addition the increased clarity, lower haze film is stiffer and may display a higher yield and secant modulus, while the impact strength remains satisfactory. A smoother film surface results than is the case with prior techniques.

These and other features, aspects and advantages of the present invention will become better understood with reference to the following description and appended claims.

DETAILED DESCRIPTION

Various embodiments of our invention concern certain classes of blown multilayer polyolefin films, and their uses. These multilayer films exhibit improved optical properties over multilayer films made from generally the same or similar materials, but fabricated in a conventional manner, for example, with substantially the same melt temperature in all layers, or with the same or similar density.

A detailed description of certain techniques for making multilayer films that are within the scope of our invention, and the preferred applications of multilayer films follow.

Those skilled in the art will appreciate that numerous modifications to these preferred embodiments can be made without departing from the scope of the invention. For example, although the properties of three layer, multilayer films using polyethylenes are used to exemplify the attributes of the techniques and materials of the present invention, the disclosed films have numerous other uses and will provide the same properties when other polymers are used in multilayer films. To the extent that our description is specific, this is solely for the purpose of illustrating preferred embodiments of our invention and should not be taken as limiting our invention to these specific embodiments.

The use of subheadings in the description is intended to assist and is not intended to limit the scope of our invention in any way.

Differentiated Melt Temperature

Embodiments of our invention may be achieved by extruding at least three polymer layers, generally from at least two extruders, where the core layer has a higher melt temperature than the skin layer or layers. The temperature differential between the outer or skin layers and the core layer or layers, will be at least 15° C., preferably at least 20° C., more preferably at least 25° C., even more preferably at least 30° C., most preferably at least 40° C.

Frost Lines

Frost lines in blown film are generally the phenomenon that a line or band running generally in the circumference of the blown film that indicates the demarcation between the molten polymer and the frozen or solidified polymer. The films of the present invention will preferably display two frost lines.

Differentiated Density

In another embodiment of our invention, different (lower) densities for at least the skin or outer layer or layers and the core layer or layers (higher densities than skin layer or layers) will also generally result in higher clarity than for two polyethylenes of the same or similar densities. The density differential should be at least 0.005 g/cm$^3$, preferably 0.010 g/cm$^3$, more preferably 0.015 g/cm$^3$, more preferably 0.020 g/cm³, even more preferably at least 0.030 g/cm³, most preferably at least 0.040 g/cm³.

It will be understood by those of ordinary skill in the art that the techniques of differentiated density and/or differentiated temperature can be used in conjunction with one another. The effects of these two techniques may be additive, that is a 20° C. difference in melt temperature, used in conjunction with a 0.020 g/cm³ density difference may, for instance, achieve the clarity goals sought. Other such combinations are contemplated, as long as the sought after clarity is obtained.

Layer Thickness

The ratio of thickness of the core layer and skin layers is generally preferred to be in the range of 1/1/1–1/4/1, more preferably 1/1.5/1–1/3/1, even more preferably 1/1.5/1–1/2.5/1, most preferably the ratio of core layer to skin layers will be 1/2/1, where the first and third numbers are understood to represent the skin layers and the middle number is representative of the core layer.

It will be further understood that the skin layers can be more than one polymer, for example, one skin layer may be a Ziegler-Natta produced polyethylene, while the other skin layer may be a metallocene produced polyethylene. The core layer may be a third type of polymer, for example, high density polyethylene (HDPE), but may also be identical to one of the skin layers, as long as either a density differential and/or a temperature differential sufficient to improve clarity can be maintained.

Ziegler-Natta produced polyethylenes, each in different layers, these polyethylenes can be blended in any layer. Further, while ABA or ABC structures are exemplified, (where A, B and/or C denote different polymers) other structures are also contemplated. For instance if a barrier polymer such as ethylene vinyl alcohol (EVOH) were used as the core layer, additional layers would likely be necessary. Such additional layers denoted A1 and C1, could be configured A/A1/B/C1/C, or A/A1/B/A1/A, or A/A1/B/A1/C or similar types of combinations and permutations. Also contemplated are blends of polymers in one, some or all of the layers.

Uses

Films of the present invention may be used in various packaging applications. Among these packaging applications is use as bread bags.

EXAMPLES

The following polymer types are used in the following examples

TABLE 1

| Polymer Type | Commercial Grade | Melt Index | Density | Comonomer and Amount | Melt ° C. | Cryst ° C. | Catalyst Type |
|---|---|---|---|---|---|---|---|
| Type A | ECD-103 | 1.0 | .918 | C6/7.7% | 117 | 102 | Metallocene |
| Type B | ECD-109 | .75 | .927 | C5/4.1% | 122 | 107 | Metallocene |
| Type C | Al-3301 | 3.0 | .934 | C6/1.5% | 126 | 110 | Conventional Ziegler-Natta |
| Type D | EX-380 | 0.9 | 0.924 | C6/5.3% | 122 | 106 | Metallocene |

Clarity

The clarity of multilayer blown films of our invention will be at least 10% improved, as measured by haze (as determined by ASTM D-1003), over the clarity or haze of films made not using techniques disclosed herein. Preferably the haze will be at least 20 percent lower, more preferably at least 40% lower, even more preferably 60% lower, most preferably 75% lower than multilayer blown films not using the techniques disclosed herein.

Polymers

In embodiments of our invention, we contemplate that many polyolefins will be useful. Included, but not so limited are polyethylenes, polypropylenes, ethylene vinyl acetate, ethylene methyl acrylate, ethylene butyl acrylate, ethylene acrylic acid, ethylene methacrylic acid, and ionomers of these acids. Polyethylenes contemplated include low density polyethylene (LDPE), medium density polyethylene (MDPE), high density polyethylene (HDPE) and very low density polyethylene (VLDPE). Polyethylenes include both those made via a Ziegler-Natta catalysis, metallocene catalysis, and combinations thereof.

Polypropylenes contemplated include both those made via Ziegler-Natta and metallocene catalysis, as well as combinations thereof.

Layer Makeup

Those of ordinary skill in the art will appreciate that while structures exemplified include metallocene polyethylene and In the case of ECD 103 and 109 each is a linear low density polyethylene available from Exxon Chemical Company, Houston, Tex., under the trade name Exceed®. Each of Al-3301, HD 6950, LL 1001 and LL 1201 are made using Ziegler-Natta catalysts and are available from Exxon Chemical Company, under the trade name Escorene®. LD 157 is a free radical initiated, high pressure polymerization produced polyethylene available from Exxon Chemical Company also under the trade name Escorene. Type D, EX 380 is a metallocene catalyst produced polyethylene, with the shown gross polymer properties produced using a silica supported, methylalumoxane activated dimethyl silyl(bis-tetrahydroindenyl)zirconium dichloride catalyst, but is not commercially available.

TABLE 2

| Pellets | Melt ° C. | Melt ent (J/g) | Cryst ° C. | Cryst ent (J/g) |
|---|---|---|---|---|
| ECD 103 | 117 | 128 | 102 | 126 |
| ECD 109 | 122 | 150 | 107 | 148 |
| HD 6950 | 134 | 232 | 115 | 223 |
| LL 1001 | 122 | 122 | 105 | 126 |
| LL 1201 | 123 | 136 | 106 | 142 |
| LD 157 BW | 116 | 154 | 103 | 147 |

All grades are available from Exxon Chemical and were produced by gas phase processes except LD 157BW which was produced by a high pressure process using free radical initiators.

Example 1

The test was performed on a Battenfeld blown film extrusion machine. The extrusion line was a 3-layer blown film line with 60, 80 and a 90 mm extruder and a 350 mm diameter die with 1.5 mm diegap. When extruding a structure with polymer Type A in all three layers, normal levels of haze were obtained. With normal we mean that the haze levels were the same as the haze level of the core layer on its own, +/−25%. A structure with Type B ECD 109 in both surface and Type A ECD 103 in the middle core layer with a distribution of thickness of the layers of 1/2/1 showed similar haze levels. When using Type B ECD 109 in the core layer and Type A ECD 103 in the surface layers, the optical (haze etc.) improved drastically. Two distinct frost lines could be seen in the bubble formed following extrusion.

A blend with HDPE or pure MD (AL3301) or ECD 109 also produced this effect.

Measurements confirmed the haze had changed from 27.5% for the "normal" version with the same metallocene polymer for all three layers ECD 103 to 3.9% for the high clarity version with differentiated densities for the core and surface layers.

Measurement also showed an increased in MD yield, TD tear and secant modulus. The physical properties are shown in Table 3.

Film samples showed a different surface morphology. The clear, low haze version had a much smoother surface. There were also some evidences of differences in orientation.

Example 2

First Run, Barmag

Experiments were performed on a Barmag blown film with 3" 60 mm extruders and a 250 mm diameter die with 1.6 mm diegap. This machine configuration results in a longer residence time in the die (3–4 times) than the Battenfeld machine. By adding HDPE to the core or by running a higher density grade in the core layer compared to the surface or outer layer, the haze could be reduced from 25% to less than 5%. Two frost-lines can be seen and a smoother surface can be detected.

TABLE 3

For Example 2-First Run, Barmag

| Layer Dist. | Composition | Haze | Gloss | Clarity | |
|---|---|---|---|---|---|
| 1/1/1 | 103/103/103 | 20.7 | 7.2 | 52.8 | |
| 1/2/1 | 103/103/103 | 22.9 | 6.5 | 54.5 | |
| 1/2/1 | 109/103/109 | 15.1 | 8.1 | 69.8 | (20–30 deg. Higher melt temp. in the core) |
| 1/2/1 | 103/109/103 | 3.7 | 13.5 | 78 | (45 deg. Higher melt temp. in the core) |

Example 2

Second Run, Barmag

In addition to Type A and B conventional LLDPE prepared with Ziegler-Natta titanium based catalysts and Type D EX__380 was used. With ECD 109 in all layers the haze was 25.7%. The high clarity version (20% HDPE blended into the core layer of ECD 109) has a haze of 4.5%.

TABLE 3(a)

| Layer | #1 | ECD109/ECD109/ECD109 |
|---|---|---|
| Composition | #2 | ECD109/80%/ECD109 20%/HD6950YN/ECD109 |
| (A/B/C) | #3 | L11001XV/LL1201XV/LL1001XV |

TABLE 4

Example 2-Second Run

| | 25 μm samples | Haze | Gloss 60° | Clarity |
|---|---|---|---|---|
| 1 | LL1001XV/LL1201XV/LL1001XV | 3.31 | 13.10 | 83.9 |
| 2 | ECD117/LL1201XV/ECD117 | 5.43 | 11.55 | 63.0 |
| 3 | ECD109/ECD109/ECD109 | 25.66 | 6.31 | 54.7 |
| 4 | ECD109/20% HD69550 80% ECD109/ECD109 | 4.45 | 13.30 | 81.5 |
| 5 | *Type 2/LD157CW/Type 2 | | | |
| 6 | Type 2 a/70% LD157CW 30% Type 2 b/Type 2 a | 12.81 | 7.22 | 62.7 |
| 7 | Type 2 a/30% LD157CW 70% Type 2 b/Type 2 a | 14.89 | 7.01 | 64.2 |
| 8 | Type 2 a/Type 2 b/Type 2 a | 16.23 | 6.63 | 60.2 |

TABLE 4(a)

| | 60 μm samples | Haze | Gloss 60° | Clarity |
|---|---|---|---|---|
| 1 | LL1001XV/LL1201XV/LL1001XV | 8.89 | 12.29 | 79.7 |
| 2 | ECD117/LL1201XV/ECD1I7 | 8.10 | 11.94 | 62.4 |
| 3 | ECD109/ECD109/ECD109 | 35.93 | 4.71 | 40.9 |
| 4 | ECD109/20% HD69550 80% ECD109/ECD109 | 10.46 | 12.52 | 75.8 |
| 5 | Type 2/LDI57CW/Type 2 | 8.35 | 9.90 | 74.1 |
| 6 | Type 2 a/70% LDI57CW 30% Type 2 b/Type 2 a | 9.12 | 9.70 | 70.4 |
| 7 | Type 2 a/30% LD157CW 70% Type 2 b/Type 2 a | 10.37 | 9.70 | 71.7 |
| 8 | Type 2a/Type 2b/Type 2a | 11.32 | 9.39 | 68.4 |

TABLE 4(b)

EXAMPLE 2 SECOND RUN

| Grade | Melt Index (g/10 min) | Density (g/cm³) | Additives |
|---|---|---|---|
| ECD-117 | 1.0 | 0.918 | PPA, Slip, antiblock |
| Type 2, mLLDPE | 0.80 | 0.919 | PPA |
| Type 2 b, mLLDPE | 1.7 | 0.927 | PPA |
| LD-157 CW | 0.6 | 0.932 | |

The high clarity version films show single peak melting in first cycle DSC and double peak in the second cycle.

TABLE 5

|  |  | Barmag 250 mm die, 1.6 mm die gap | | | BATTENFELD, UK 04/1996 (350 mm die, 1.6 mm die gap) | |
| --- | --- | --- | --- | --- | --- | --- |
| Sample |  | 1 | 2 | 3 (9a) | 4 (9a) | |
| BUR | — | 2.4 | 2.4 | 2.4 | 3.0 | 3.0 |
| Output | kg/hr | 90 | 92 | 94 | 248 | 271 |
| Layer configuration | (%) | 25/50/25 | 25/50/25 | 25/50/25 | 33/50/17 | 25/52/23 |
| Layer Composition | A | ECD 109 | ECD 109 | LL 1001XV | ECD 103 | ECD 103 |
|  | B | EDC 109 | 80% ECD 109 20% HD6950YN | LL 1201XV | ECD 103 | ECD 109 |
|  | C | ECD 109 | ECD 109 | LL 1001XV | ECD 103 | ECD 103 |
| Thickness | μm | 25 | 25 | 25 | 25 | 25 |
| Tensile at yield MD | MPa | 15.1 | 16.4 | 12.6 | 7.34 | 8.58 |
| Tensile at yield TD | MPa | 16.3 | 18.1 | 13.5 | 7.52 | 8.62 |
| Tensile at break MD | MPa | 62.3 | 64.6 | 53.1 | 69.7 | 65.5 |
| Tensile at break TD | MPa | 56.6 | 53.6 | 40.9 | 84.5 | 83.6 |
| Elongation at break MD | % | 546 | 610 | 609 | 592 | 608 |
| Elongation at break TD | % | 655 | 662 | 778 | 661 | 669 |
| Energy at break MD | mJ/mm$^3$ | 133 | 159 | 144 | 125 | 128 |
| Energy at break TD | mJ/mm$^3$ | 152 | 152 | 150 | 133 | 139 |
| Secant modulus MD | MPa | 351 | 414 | 280 | 128 | 159 |
| Secant modulus TD | MPa | 389 | 490 | 332 | 123 | 154 |
| Haze | % | 25.7 | 4.45 | 3.31 | 27.5 | 3.9 |
| Haze Internal | % | 3.65 | 2.33 | 1.74 |  |  |
| Gloss | % | 6.32 | 13.3 | 13.1 | 6.7 | 13.7 |
| Clarity | % | 54.7 | 81.5 | 83.9 | — | 82.2 |
| Elmendorf tear MD | g/μm | 9.88 | 5.69 | 4.42 | 11.1 | 11.8 |
| Elmendorf tear TD | g/μm | 14.9 | 17.1 | 15.7 | 13 | 15 |
| Dart | g/μm | 5.2 | 4.9 | 2.151 | >45.2 | >53.5 |
| Blockness |  | Low | Low | Very high | Low | High |

It is expected that similar results can be obtained with modified polymer grades such as those having an improved shear sensitivity as shown by higher HighLoad/LowLoad Melt Index ratios, melt strengths or Internal Energy of Activation. Such grades may be used particularly for the core layer where the added melt strength may be of particular benefit but also of course for the surface layers.

Comparable benefits may also be obtained for two layer films where the core layer is left exposed on one side. However, a minimum of three layers is preferred. The same process modifications and/or density-crystallinity modifications may have similar effects in the case of polypropylene, where the crystallinity may be varied by the addition of ethylene comonomer.

Although the present invention has been described in considerable detail with reference to certain preferred embodiments thereof, other embodiments are possible. For example while films and multilayer films are exemplified, other uses are contemplated. Therefore the spirit and scope of the appended claims should not be limited to the description of the preferred embodiments contained herein.

What is claimed is:

1. A process for improving the clarity of multilayer blown films comprising:
    selecting a first polyolefin from the group consisting of LLDPE, MDPE, and LDPE;
    selecting a second polyolefin, wherein said second polyolefin is the same as or different from the first polyolefin; and
    extruding said first and said second polyolefins from a die, wherein the first polyolefin forms a first and a second skin layer, wherein said second polyolefin forms a core layer, wherein said core layer is extruded at least 30° C. higher in melt temperature than said first polyolefin, wherein the multilayer film has a haze as determined by ASTM D-1003 at least 40% lower than a multilayer film extruded with the skin and core layers extruded at substantially the same melt temperature.

2. The process of claim 1 wherein said first and said second polyolefins are metallocene produced polyethylenes having a density in the range of from 0.915–0.940 g/cm$^3$.

3. The process of claim 1 wherein said first and said second polyolefins are polyethylenes and wherein said second polyethylene has a density at least 0.015 g/cm$^3$ greater than the density of said first polyethylene.

4. The process of any of claims 1–3 wherein the ratio of the thickness of said skin layers to said core layer is in the range of from 1/1.5/1–1/2.5/1.

5. A method of improving clarity in multilayer blown films comprising:
    selecting a first polyethylene and a second polyethylene; and extruding said first and said second polyethylenes such that said first polyethylene forms a first and a second skin layer, and said second polyethylene forms a core layer;

wherein both the melt extrusion temperature and the density of the core layer are higher than the melt extrusion temperature and density of the skin layers, the haze of the multilayer blown film is at least 60% lower, as measured by ASTM D-1003, than a film made from polyethylenes wherein the melt extrusion temperature and density are substantially the same for both said first and said second polyethylenes.

6. The method of claim 5 wherein the haze of the multilayer blown film is at least 75% lower, as measured by ASTM D-1003, than a film made from polyethylenes wherein the melt extrusion temperature and density are substantially the same for both said first and said second polyethylenes.

7. The method of claim 5, wherein the melt extrusion temperature of the core layer is at least 15° C. greater than the melt extrusion temperature of the skin layers.

8. The method of claim 5, wherein the melt extrusion temperature of the core layer is at least 20° C. greater than the melt extrusion temperature of the skin layers.

9. The method of claim 5, wherein the melt extrusion temperature of the core layer is at least 25° C. greater than the melt extrusion temperature of the skin layers.

10. The method of claim 5, wherein the melt extrusion temperature of the core layer is at least 30° C. greater than the melt extrusion temperature of the skin layers.

11. The method of claim 5, wherein the melt extrusion temperature of the core layer is at least 40° C. greater than the melt extrusion temperature of the skin layers.

12. The method of claim 5, wherein the density of the core layer is at least 0.005 g/cm$^3$ greater than the density of the skin layers.

13. The method of claim 5, wherein the density of the core layer is at least 0.010 g/cm$^3$ greater than the density of the skin layers.

14. The method of claim 5, wherein the density of the core layer is at least 0.015 g/cm$^3$ greater than the density of the skin layers.

15. The method of claim 5, wherein the density of the core layer is at least 0.020 g/cm$^3$ greater than the density of the skin layers.

16. The method of claim 5, wherein the density of the core layer is at least 0.030 g/cm$^3$ greater than the density of the skin layers.

17. The method of claim 5, wherein the density of the core layer is at least 0.040 g/cm$^3$ greater than the density of the skin layers.

* * * * *